United States Patent [19]

Koyahara et al.

[11] Patent Number: 4,742,409
[45] Date of Patent: May 3, 1988

[54] MAGNETIC DISC UNIT

[75] Inventors: Masaru Koyahara; Shigeki Koizumi; Nobuhiro Aisawa; Tetsuo Tomita; Noriyuki Kawamura, all of Chichibu, Japan

[73] Assignee: Canon Denshi Kabushiki Kaisha, Chichibu, Japan

[21] Appl. No.: 914,541

[22] Filed: Oct. 1, 1986

Related U.S. Application Data

[63] Continuation of Ser. No. 486,481, Apr. 19, 1983, abandoned.

[30] Foreign Application Priority Data

Apr. 22, 1982 [JP]  Japan .................. 57-66291
Jun. 1, 1982 [JP]  Japan .................. 57-94597

[51] Int. Cl.[4] .............................................. G11B 5/54
[52] U.S. Cl. ........................................ 360/105; 360/99
[58] Field of Search .................................. 360/97–99, 360/105–106

[56] References Cited

U.S. PATENT DOCUMENTS 4,602,306  7/1986  Noda .................. 360/99

Primary Examiner—A. J. Heinz
Attorney, Agent, or Firm—Spencer & Frank

[57] ABSTRACT

A magnetic disc unit comprising motor means having a spindle rotatably mounted on a base for rotating a magnetic recording medium, a loading arm having one end swingably attached to the base and a center cone rotatably attached to the other end of the loading arm. The magnetic recording medium is interposed between the spindle and the center cone. A button lever having a control button projecting from one end is attached to the base and is movable with respect thereto. A clamping lever is also mounted to the base and linkage means interlocks the control button and the clamping lever. Depression of the control button translates the button lever so as to rotate the clamping lever to a first position in which the center cone engages the spindle with the magnetic recording medium interposed therebetween. Further depression of the control button translates the button lever to rotate the loading arm to a second position in which the center cone is released from the magnetic recording medium and the clamping lever presses the loading arm in the vicinity of the center cone.

6 Claims, 15 Drawing Sheets

FIG_3

FIG_4

FIG_6
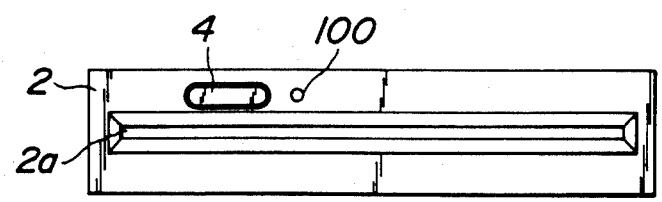
FIG_7
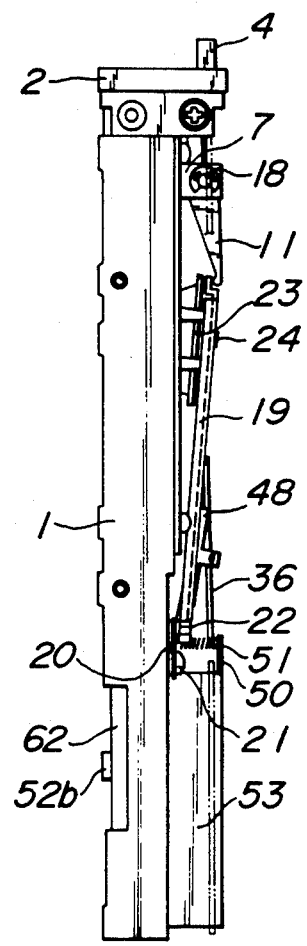

FIG_8a
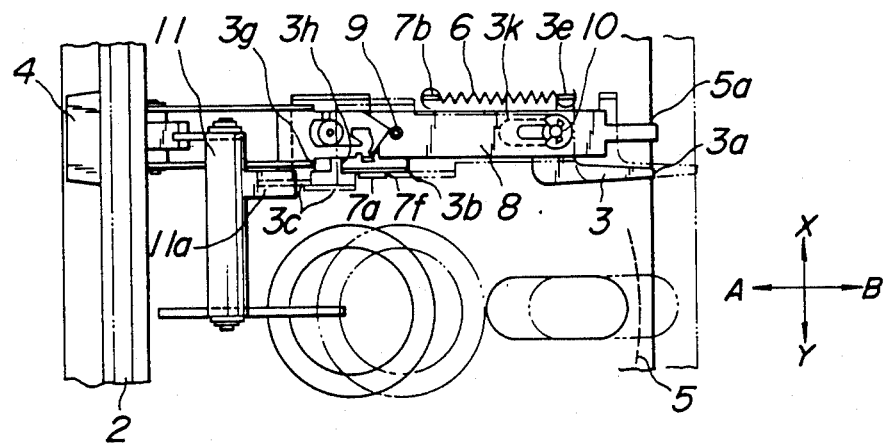
FIG_8b
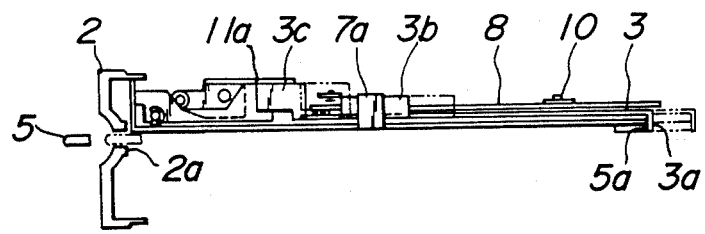

FIG_15
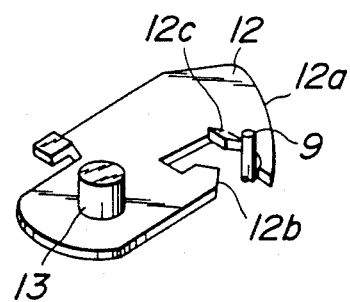
FIG_16
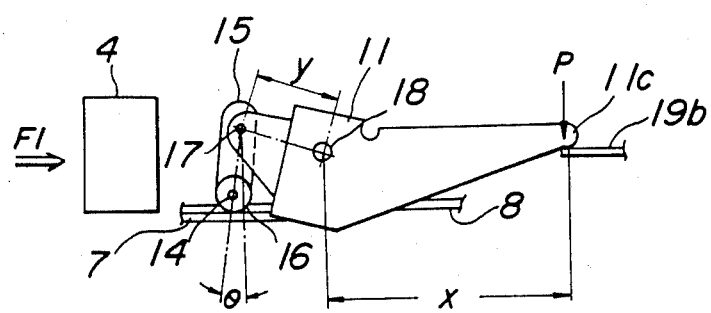

FIG.19A

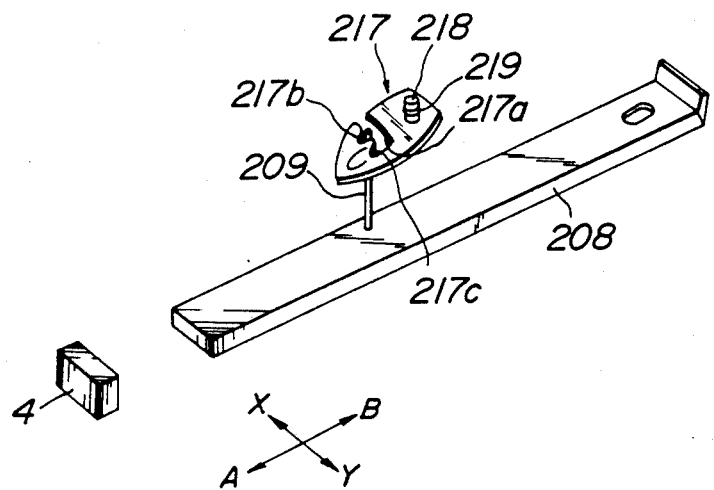
FIG.27
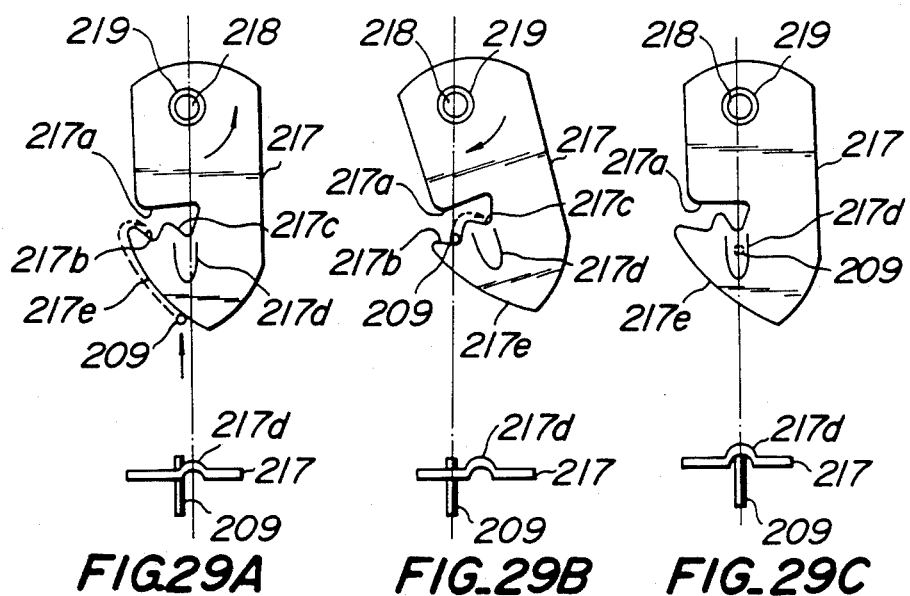
FIG.28A  FIG.28B  FIG.28C
FIG.29A  FIG.29B  FIG.29C

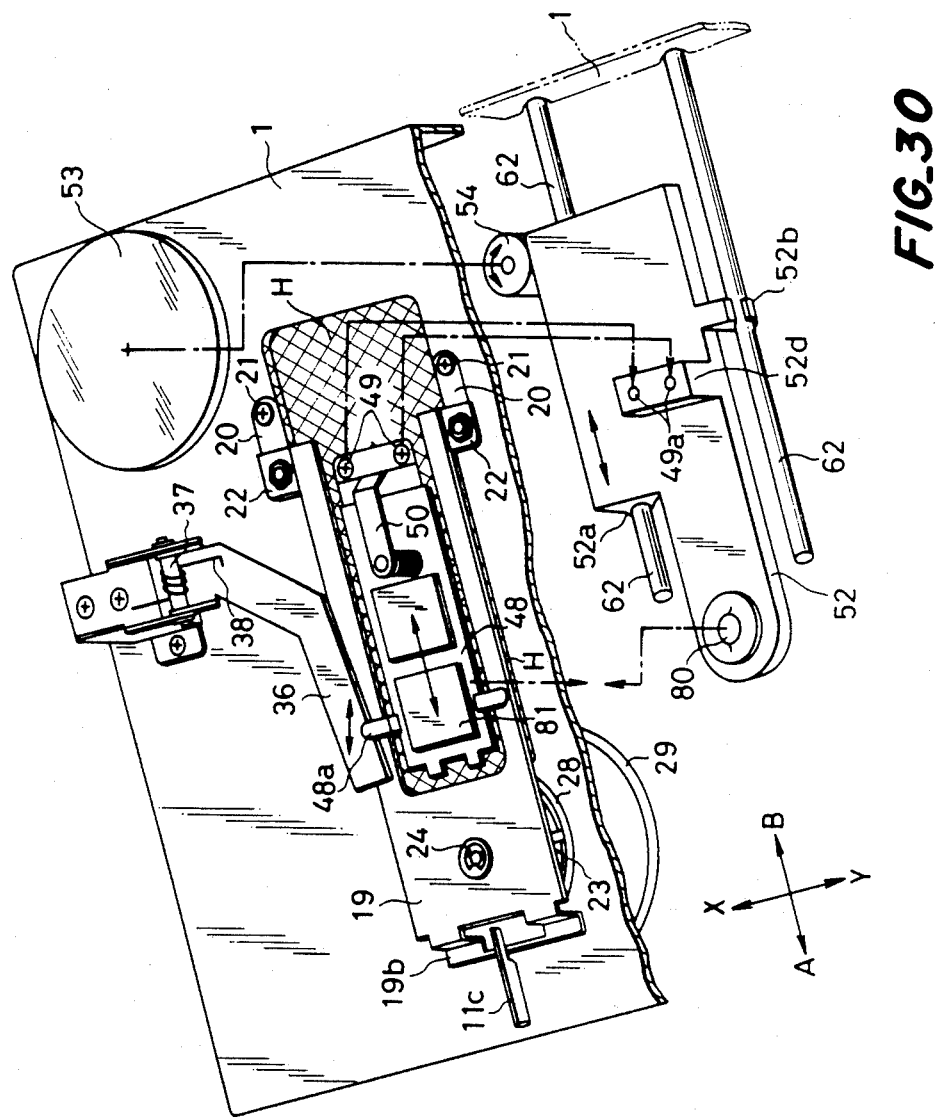

MAGNETIC DISC UNIT

This application is a continuation, of application Ser. No. 486,481, filed Apr. 19, 1983, now abandoned.

BACKGROUND OF THE INVENTION

1. Field of the Invention

The present invention relates to a magnetic disc unit comprising mechanisms which ensure the loading of a magnetic recording medium such as a floppy disc.

2. Description of the Prior Art

A magnetic disc unit, for instance, a floppy disc unit is an apparatus for magnetic recording or reproducing information on or from a magnetic disc or floppy disc as a magnetic recording medium, and has mainly been used for external storage in computer systems.

The prior art magnetic disc unit has many disadvantages as follows:

FIG. 1 is a side view showing a conventional type of a clamping mechanism of a magnetic disc 71. Here, a center cone 73 as the clamping mechanism is attached to a medium loading arm 74 so that a magnetic disc 71 is stably clamped between the center cone 73 and a spindle 72 as a driving mechanism of the magnetic disc 71. The medium loading arm 74 has a large radius of gyration R so that the center cone 73 is moved linearly in parallel with an axis 72a of the spindle 72 when the magnetic disc 71 is just clamped. By raising and lowering an end 74a of the medium loading arm 74, the magnetic disc 71 is released and clamped, respectively.

Although the conventional clamping mechanism has an advantage that the center cone 73 is stably positioned when clamping, the amount of movement of the end portion 74a of the arm 74 is large, so that the height H of the magnetic disc unit is elongated.

In another conventional type of a clamping mechanism, a shaft is provided just over a spindle so that a center cone is moved along the shaft. While the clamping mechanism has an advantage that the height of the magnetic disc unit can be reduced, the clamping mechanism has disadvantages in that the a clearance between the shaft and the center cone unstably positions the center cone, and that a large pressure is needed when clamping.

In the prior art, the clamping mechanism may sometimes be operated even if the magnetic disc 71 is not inserted perfectly into the magnetic disc unit. This results in damage to the surface 71a of the magnetic disc 71 by the center cone 73. The prior art magnetic disc unit does not have an ejecting mechanism for ejecting the disc 71, so that removal of the magnetic disc 71 is difficult.

FIG. 2 is a side view showing a conventional type of a head loading mechanism having a head loading arm 75 and a solenoid 78 for driving the head loading arm 75. A magnetic head 76 and a sponge pad 77 are provided on the head loading arm 75.

When the head loading arm 75 is pulled down by the solenoid 78 so that the magnetic head 76 contacts the magnetic disc 71, the sponge pad 77 resiliently presses the magnetic disc 71 in such a manner that the vertical vibration of the magnetic disc 71 is restrained. This pad forms a stabilizer mechanism.

However, the pressure of the sponge pad 77 is maximum just after the sponge pad 77 has pressed the magnetic disc 71, and the pressure decreases gradually thereafter. Accordingly, it is difficult to press uniformly and steadily the magnetic disc 71. In addition, at the time of head loading, the operating noise of the solenoid 78 is loud. It is required to provide a link member between the head loading arm 75 and the solenoid 78 for preventing magnetization of the head loading arm 75 by the solenoid 78.

SUMMARY OF THE INVENTION

It is a first object of the present invention to provide a magnetic disc unit which does not have the disadvantages of the conventional magnetic disc unit described above.

It is a second object of the present invention to provide a magnetic disc unit in which a center cone as a loading member is stably positioned, and in which the height of the unit is lowered.

It is a third object of the present invention to provide a magnetic disc unit in which a magnetic recording medium is pressed with a maximum pressure at the end of the clamping process consisting of clamping the magnetic recording medium to the unit.

It is a fourth object of the present invention to provide a magnetic disc unit in which a magnetic recording medium is ejected unless the magnetic recording medium is not inserted into a predetermined position of the unit so that damage to the magnetic recording unit due to misoperation is prevented, and in which the magnetic recording medium is not ejected until a magnetic head is separated from the magnetic recording medium in an ejecting process.

It is a fifth object of the present invention to provide a magnetic disc unit in which a magnetic recording medium is pressed uniformly, and in which the operating noise of the solenoid is reduced and the magnetization of a head loading arm is prevented.

BRIEF DESCRIPTION OF THE DRAWINGS

FIGS. 4, 5, 6 and 7 are a top end view, a bottom end view, a front view and a side view, respectively, showing members mounted on a base in a magnetic disc unit according to the present invention;

FIGS. 8a and 8b are a top end view and a side view, respectively, showing the insertion and locking of a magnetic disc in a magnetic disc unit according to the present invention;

FIG. 15 is an enlarged perspective view showing an embodiment of a latch member of the latch mechanism;

FIG. 16 is a side view showing the operation of an embodiment of a linkage in a magnetic disc unit according to the present invention;

FIGS. 19A and 19B are a plan view and a front view, respectively, showing another embodiment of the lock mechanism;

FIG. 27 is a perspective view showing another embodiment of a latch mechanism in a magnetic disc unit according to the present invention;

FIGS. 28A, 28B and 28C are top end views successively showing operations of the latch mechanism shown in FIG. 27;

FIGS. 29A, 29B and 29C are front views successively showing operations of the latch mechanism shown in FIGS. 28A, 28B and 28C, respectively.

FIG. 30 is a perspective view of the magnetic disc unit of the present invention with the loading arm swung to its upward position.

DETAILED DESCRIPTION OF THE PREFERRED EMBODIMENTS

Figure 1:
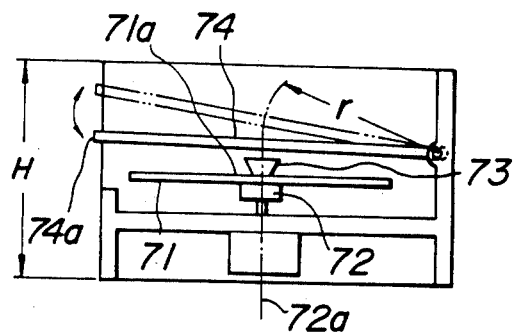
FIG. 1 is a diagrammatic side view showing an example of a conventional magnetic disc unit.
Figure 2:
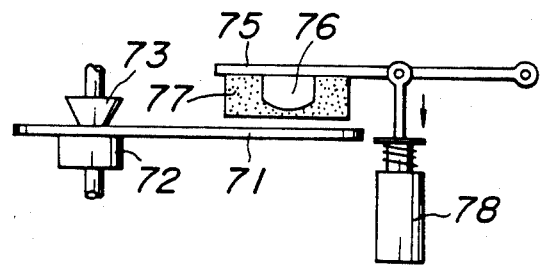
FIG. 2 is a side view showing an example of a conventional head loading mechanism using a solenoid.
Figure 3:
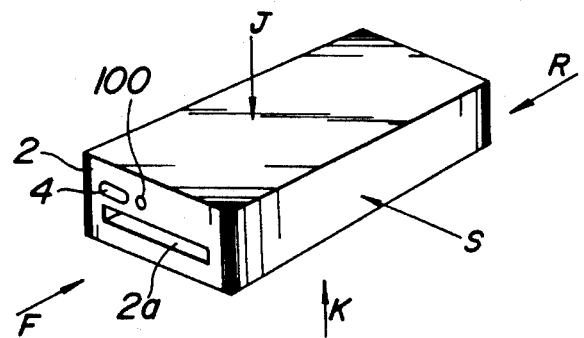
FIG. 3 is a perspective view showing a magnetic disc unit according to the present invention.

FIG. 3 is an external view of a magnetic disc unit. In the following description and figures, it is assumed that directions shown by arrows F, R, J, K and S indicate a front view, a back view, a top view, a bottom view and a right side view of the unit, respectively.

Outlines of the magnetic disc unit are given referring to a top view, a bottom view, a front view and a right side view shown in FIGS. 4, 5, 6 and 7, respectively. Reference numeral 1 denotes a base for mounting various mechanisms of the magnetic disc unit. Reference numeral 2 denotes a front panel having an inlet opening 2a for receiving a magnetic recording medium or magnetic disc 5 shown in FIGS. 8a and 8b. Reference numeral 3 denotes an ejecting lever for ejecting the magnetic disc 5. The ejecting lever 3 is pulled in the direction A constantly by a spring 6. Reference numeral 7 denotes a mounting plate which is fixed to the base 1 to guide the magnetic disc 5 in a vertical direction, and on which an ejecting mechanism and a clamping mechanism are mounted.

Reference numeral 4 denotes a control button for clamping or ejecting the magnetic disc 5 and permitting it to be shifted in directions A and B. The control button 4 is coupled to a button lever 8 on which a latch 12 for locking the shifting of the control button 4 is mounted.

A clamping lever 11 is rotatably mounted on the mounting plate 7 through a pin 18, so that the clamping lever 11 is rotatable around the pin 18. One end of the clamping lever 11 is coupled to the button lever 8 through a link 15 by a pin 14. Another end of the clamping lever 11 contacts an end of a loading arm 19 which is provided swingably upward and downward on the base 1 via a leaf spring 20.

Figure 13:
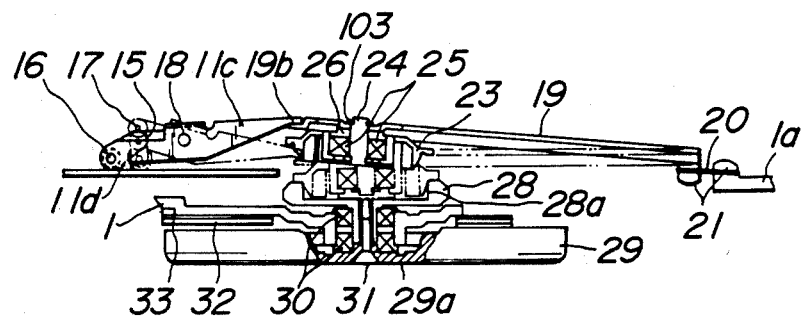

A center cone 23 is rotatably mounted to the loading arm 19 by a pin 24 and a bearing 25 (See FIG. 13).

Figure 5:
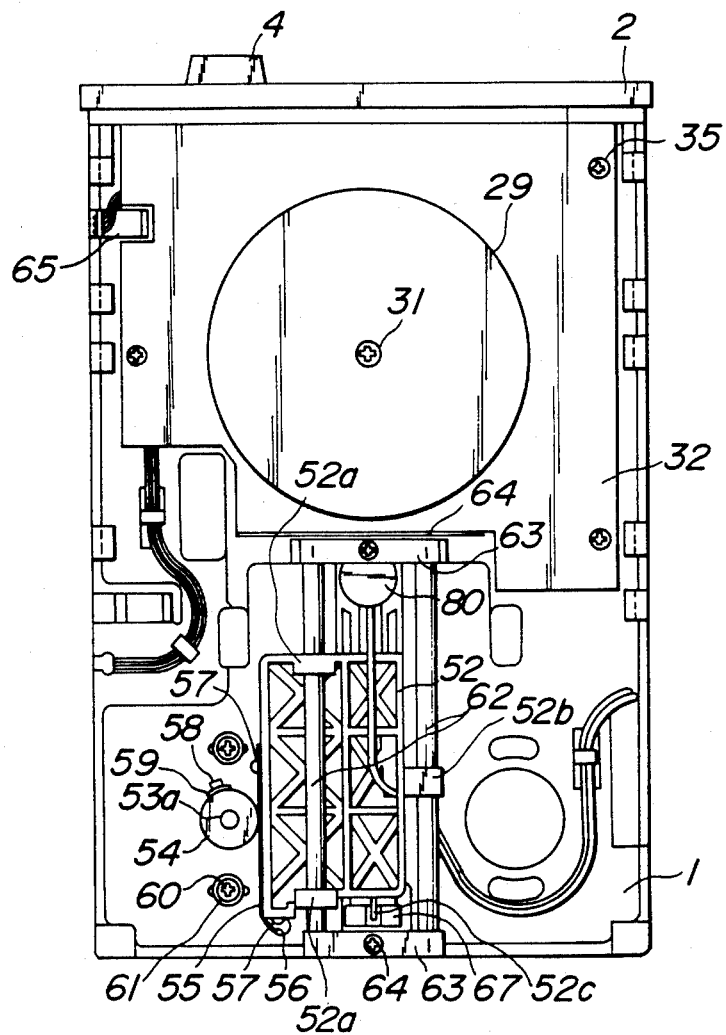

A spindle 28 for positioning and driving the magnetic disc 5 is disposed opposite to the center cone 23, and is rotatable via a bearing 30 inserted into the base 1. The spindle 28 is coupled to a rotor 29 of a motor such as a direct drive motor (DDM) by a screw 31. Reference numeral 32 shown in FIG. 5 is a printed-circuit board having a circuit for driving the rotor 29 of the motor, and is fixed to the base 1 by screws 35.

Reference numeral 36 is a head loading arm, the detail of which is shown in FIGS. 17-24. The head loading arm 36 is driven by a head loading solenoid 41 to move a head arm 48, so that a magnetic gimbal head 81 is loaded to a write/read position. A sponge pad 43 for stabilizing the vibration of the magnetic disc 5 is mounted on the head loading arm 36.

Reference numeral 52 denotes a head carriage on which a button head 80 is mounted and to which the head arm 48 carrying the gimbal head 81 is fixed by screws 49. The head carriage 52 is slidably supported in both directions A and B along guide bars 62 which are fixed to the base 1 via keep panels 63 by screws 64. Via a steel belt, the head carriage 52 is coupled to a pulley 54 secured to a stepping motor mounted on the base 1.

Reference numeral 65 denotes a detector for detecting the existence of a notch attached to the jacket of the magnetic disc 5 to prevent rewriting.

Reference numeral 66 denotes a detector for detecting an index hole of the magnetic disc 5.

Reference numeral 67 denotes a detector for detecting a reference position of tracks for determining a track position of the magnetic disc 5 with respect to the heads.

Reference numeral 100 denotes an indicator like a light emitting diode (LED) or a lamp for indicating the operating condition of the magnetic disc unit.

Each mechanism of the magnetic disc unit will be described in detail.

First, descriptions of a clamping mechanism and an ejecting mechanism for the magnetic disc are given referring to FIGS. 8-11.

Figure 4:
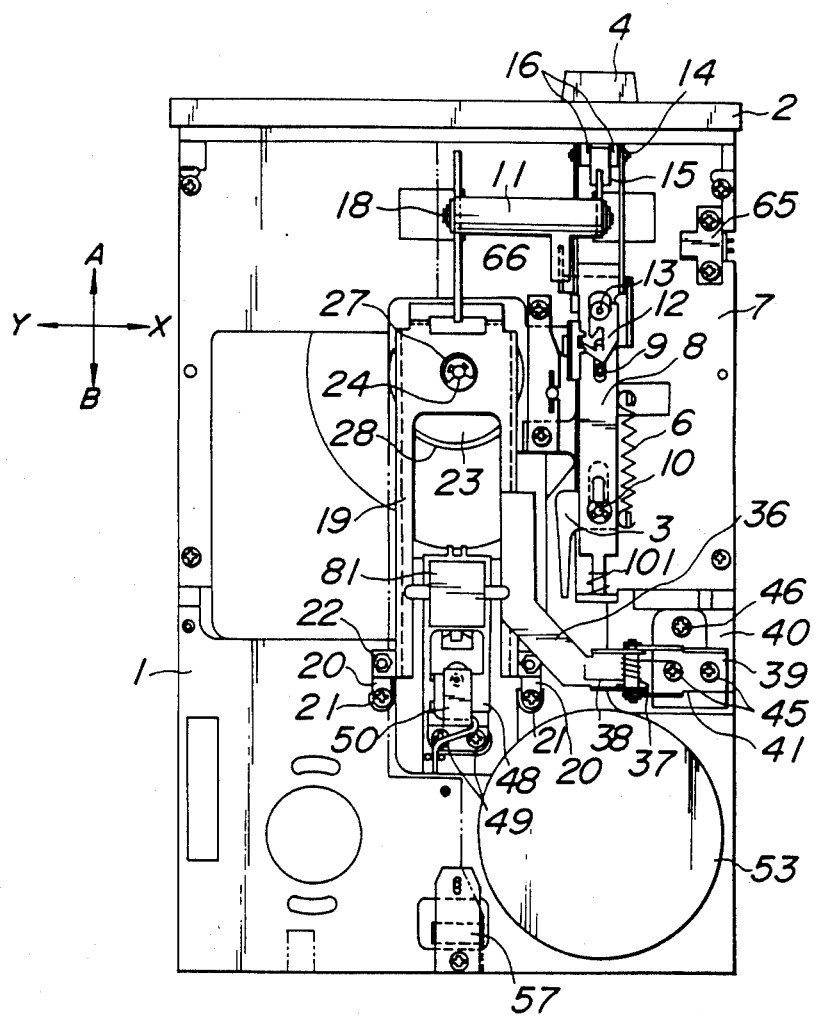

The magnetic disc 5 is inserted into a space between the base 1 and the mounting plate 7 in the direction B shown in FIG. 4 through the inlet opening 2a on the front panel 2.

The magnetic disc 5 is inserted further so that the edge 5a of the jacket of the magnetic disc 5 is in contact with a down bend 3a of the ejecting lever 3, and then the ejecting lever 3 is moved in the direction B by further inserting the magnetic disc 5. In this manner, the ejecting lever 3 is guided through a guide slit 3k formed on the ejecting lever 3 in the direction B by a pin 10 fastened to the base 1.

The ejecting lever 3 is constantly biased toward the direction A by the ejecting spring 6 stretched between an up bend 3e of the ejecting lever 3 and an up bend 7b of the mounting plate 7. A force which acts on the ejecting lever 3 in the direction A by the spring 6 and a force which acts on the down bend 3a in the direction B by the inserted magnetic disc 5 generate a turning force which acts to rotate an up bend 3b of the ejecting lever 3 in the direction Y around the pin 10, so the up bend 3b is contacted and guided by an up bend 7a of the mounting plate 7.

By further inserting the magnetic disc 5, the up bend 3b of the ejecting lever 3 contacts the up bend 7a of the mounting plate 7 to move in the direction B along the up bend 7a, and then the up bend 3b is disengaged from the up bend 7a to rotate in the direction Y by a turning force given to the up bend 3b until an edge 3g of the ejecting lever 3 is in contact with the up bend 7a so that the ejecting lever 3 is stopped. When the ejecting lever 3 is stopped, an edge 3h of the up bend 3b is in contact with an edge 7f of the up bend 7a, so that the ejecting lever 3 is prevented from moving in the direction A. This condition is defined as a lock condition of the magnetic disc. The lock condition of the magnetic disc is illustrated by a two-dot-and-dash line in FIG. 8a In the lock condition, an up bend 3c of the ejecting lever 3 is positioned at the position illustrated with a two-dot-and-dash line in FIGS. 8a and 8b, and is disengaged from an arm 11a of the clamping lever 11.

In this condition, the clamping lever 11 is rotatable upward and downward when the control button 4 is pushed. Namely, when the magnetic disc 5 is not in the lock condition, i.e., the magnetic disc 5 is defectively inserted into the magnetic disc unit, then the up bend 3c is positioned under the arm 11a of the clamping lever 11, so that the arm 11 is prevented from rotating, downward. As a result, the control button cannot be pushed. Therefore, the magnetic disc 5 is not clamped when the magnetic disc is defectively inserted into the unit, so that the magnetic disc 5 is prevented from being damaged.

The clamping mechanism for the magnetic disc and a lock mechanism for the control button will be explained with reference to FIGS. 9–13.

If the control button 4 is pushed in the direction B in the lock condition of the magnetic disc, the button lever 8 fixed to the control button 4 is moved in the direction B by the guidance of the pins 9 and 10 fixed to the mounting panel 7. The latch 12, as shown in FIG. 15, is a member for preventing the return of the control button 4 in the direction A. The latch 12 is rotatably supported by a pin 13 fixed to the button lever 8.

A spring (not illustrated) forces the latch 12 in the direction Y, so that the latch 12 is contacted by an up bend 8a of the button lever 8. Consequently, the up bend 8a prevent the latch 12 from moving in the direction Y.

If the control button 4 is kept pushed, the button lever 8 moves in the direction B, so that a cam face 12a of the latch 12 is contacted by the pin 9. If the control button 4 is further pushed, the latch 12 is rotated in the direction X (FIG. 4) around the pin 13 by a reaction which acts on the cam face 12a in contact with the pin 9 against a force which acts on the latch 12 in the direction Y by the spring (not illustrated).

If the control button 4 is further pushed, the pin 9 is disengaged from the cam face 8a, so that the latch 12 is rotated in the direction Y by the spring (not illustrated) and the pin 9 fits into a latch groove 12b of the latch 12. This condition is shown by a two-dot-and-dash line in FIG. 12, and is defined as a lock condition of the control button. If the control button 4 is pushed in the direction B in the lock condition of the magnetic disc, the button lever 8 fixed to the control button 4 moves in the direction B.

Rollers 16 and an end of a link 15 are rotatably coupled to the button lever 8 by a pin 14. Another end of the link 15 is rotatably linked to an arm 11e of the clamping lever 11 by a pin 17. A linkage is constructed by the clamping lever 11 and the link 15. The clamping lever 11 is rotatably coupled to the up bends 7c of the mounting plate 7 by a pin 18.

With the movement of the button lever 8 in the direction B, the rollers 16 move while rotating on the mounting plate 7 in the direction B. The clamping lever 11 forms a linkage mechanism together with the link 15. If one end of the link 15 rotatably coupled to the pin 14 moves in the direction B, the other end of the link 15 rotatably links to the arm 11e via the pin 17, so that the arm 11e is pushed upward by the link 15 to rotate around the pin 18, and the arms 11a and 11c of the clamping lever 11 move downward.

The arm 11c is in contact with a lug 19b of the loading arm 19 which is fixed to the part 1a of the base 1 via leaf springs 20. The leaf spring 20 always exerts a force to raise the loading arm 19 upward. Consequently, the arm 11c of the clamping lever 11 which is in contact with the lug 19b of the loading arm 19 is forced to be raised upward around the pin 18.

As mentioned above, if the control button 4 is pushed in the direction B, the linkage mechanism forces the arm 11c to press the loading arm 19, downward against the leaf springs 20. With this movement, the center cone 23 mounted to the loading arm 19, while guiding the center hole of the magnetic disc 5, fits into a hole 28a of the spindle 28, so that the magnetic disc 5 keeps its center between the center cone 23 and the center of spindle 28.

The center cone 23 is rotatably supported around the shaft 24 by the bearing 25. The assembly which consists of the center cone 23, the shaft 24 and the bearing 25 is defined as a cone assembly. Between the cone assembly and the loading arm 19, a cone spring 26 is attached in a compressed manner to generate a constant force. A retaining ring 103 is inserted into the upper part of the shaft 24 so as to prevent the cone assembly from slipping out from the loading arm 19 together with the cone spring 26.

As the control button 4 is further pushed, the loading arm 19 is correspondingly lowered, so that a spring force biased by the cone spring 26 is applied to the spindle 28 through the center cone 23 and the magnetic disc 5.

Figure 14:
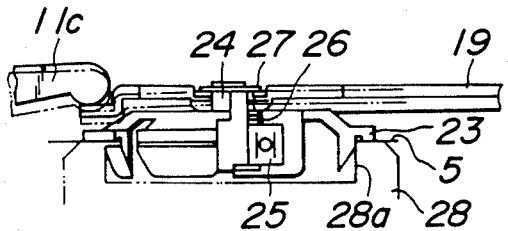
FIG. 14 is a partial side view showing the medium clamping mechanism shown in FIGS. 12 and 13 clamping the magnetic disc.

The condition which is shown by a two-dot-anddash line in FIG. 14 is defined as a medium clamping condition.

At the moment that the magnetic disc 5 is clamped, i.e., at the moment that the biased force of the cone spring 26 is applied to the magnetic disc 5, the reaction of the biased force acts on the arm 11c of the clamping lever 11. Accordingly, a large force is required to lower the arm 11c. In this condition, the link 15 takes a position which is close to a substantially upright position as indicated by a two-dot-and-dash line in FIG. 13, so that the component of force in the direction A is small. Accordingly, a small force clamping the control button 4 is sufficient for the above-mentioned operation.

The reason will be explained with reference Fig. 16. In FIG. 16, it is assumed that:

F1: a force for clamping

θ: an angle defined by the straight line which passes through the pins 14 and 17 and the perpendicular line which passes through the pin 17.

y: the distance between the pins 17 and 18 x: distance between the pin 18 and a point where the end of the arm 11c is in contact with the lug 19b of the loading arm 19

P: a force acting on the point where the lug 19 is in contact with the arm 11c f: the total friction between the mounting plate 7 and the roller 16 and between the mounting plate 7 and the button lever 8.

Then, the clamping force F1 is defined by the following equation.

$$F1 = (x/y) \cdot P \cdot \tan \theta + f$$

If $\theta \simeq 0$, then $\tan \theta \simeq 0$, so that the force F1 is nearly equal to the total friction f. In other words, only the friction f contributes to the clamping force F1. As a result, a very small clamping force F1 is sufficient, if the link 15 takes an upright position when the clamping operation is completed, i.e., if $\theta = 0$ is satisfied.

Figure 9:
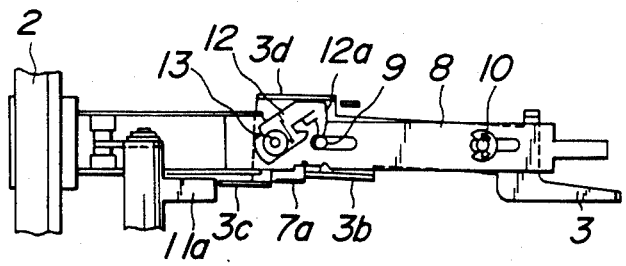
FIG. 9 is a top end view showing the operation of an embodiment of a latch mechanism in a magnetic disc unit according to the present invention.

As shown in FIG. 9, simultaneously with the above-mentioned locking of the control button 4, the latch 12 rotates in the direction X to push the up bend 3b of the ejecting lever 3. Thus, the above-mentioned engagement of the up bend 3b with the up bend 7a in the lock condition of the magnetic disc is released, so that the ejecting lever 3 is movable in the direction A by the spring 6, and the ejection of the magnetic disc 5 is permitted.

Figure 10:
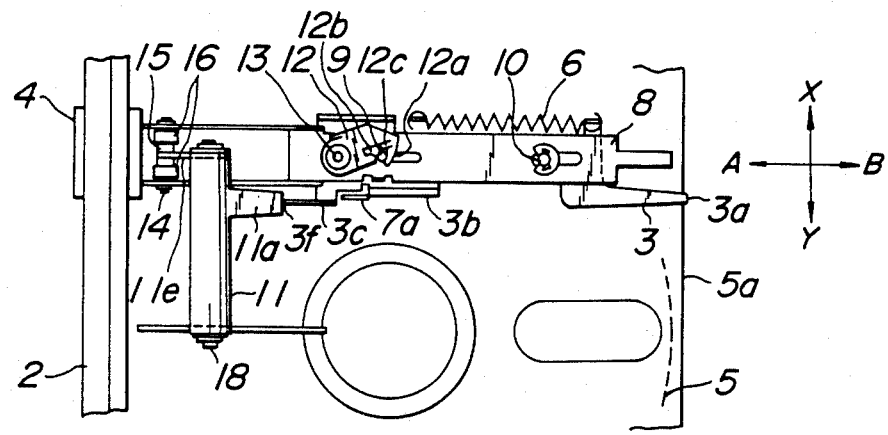
FIGS. 10 and 11 are a top end view and a side view, respectively, showing the locking condition of an embodiment of a control button in a magnetic disc unit according to the present invention.
Figure 11:
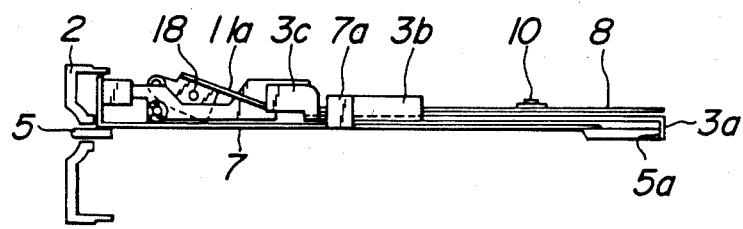
Figure 12:
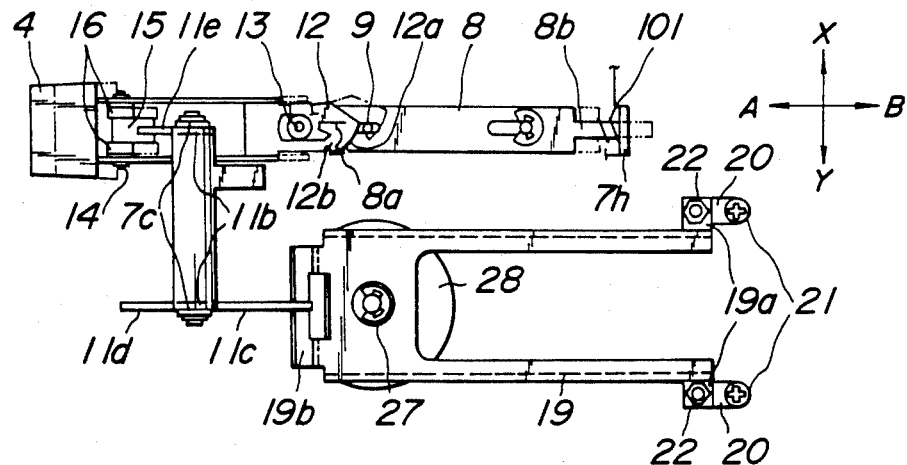
FIGS. 12 and 13 are a top end view and a side view, respectively, showing an embodiment of a medium clamping mechanism in a magnetic disc unit according to the present invention.

At the same time, the magnetic disc is clamped, so that the arm 11a falls to contact the edge 3f of the up bend 3c. Thus, the ejecting lever 3 is prevented from moving in the direction A, as shown in FIG. 10 and FIG. 11 which is side view of FIG. 10.

At this stage, the inserting and the clamping of the magnetic disc 5 are completed, so that the magnetic disc unit is ready to record or reproduce information on or from the magnetic disc 5.

Referring to FIGS. 9-13, the release from the lock condition of the control button, i.e., the release from the medium clamping and the ejection of the magnetic disc 5 are described.

In the lock condition of the control button, if the control button 4 is further pushed, the button lever 8 moves in the direction B and at the same time the latch 12 moves in the direction Y. The pin 9 sitting in the latch groove 12b comes under a notched bend 12c of the latch 12 by the rotation of the latch 12 in the direction Y, as shown by a two-dot-and-dash line in FIG. 12, so that the button lever 8 is returned toward the direction A by a spring 101 provided on the arm 8b of the button lever 8 and the leaf springs 20.

The arm 11a of the clamping lever 11 is raised along the edge 3f of the up bend 3c, so that the engagement of the arm 11a with the up bend 3c is disengaged.

Then, the ejecting lever 3 becomes free and returns toward the direction A by the spring 6, while the end surface 5a of the magnetic disc 5 is engaged with the down bend 3a. In this way, the magnetic disc 5 is ejected.

The rotation of the clamping lever 11 is interlocked to the motion of the loading arm 19. The engagement of the arm 11a with the up bend 3c is disengaged just before the loading arm 19 is raised completely. Thus, the magnetic disc is ejected after the head arm 48 and the gimbal head 81 are raised by the loading arm 19 via the head loading arm 36. That is, the magnetic disc 5 is protected against damage caused by the engagement of the magnetic disc 5 with the gimbal head 81.

The protection of the magnetic disc 5 may be realized as follows.

A latch energized by an elastic member is provided on the clamping lever. By utilizing the movement of the head loading arm, the elastic member may be controlled in a manner that the latch prevents the clamping lever from moving, so that the magnetic disc is retained in its clamping condition.

Figure 17:
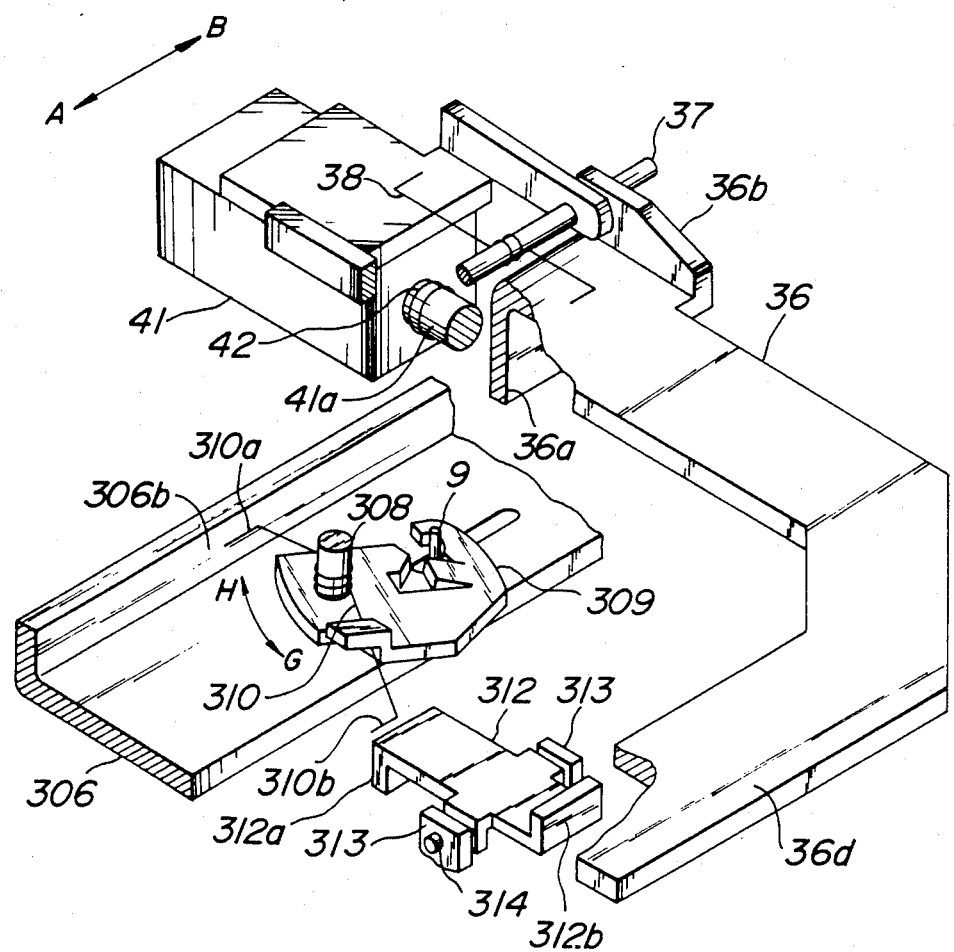
FIG. 17 is a perspective view showing an embodiment of a lock mechanism for preventing a magnetic disc from being ejected while head loading in another embodiment of a magnetic disc unit according to the present invention.
Figure 18A:
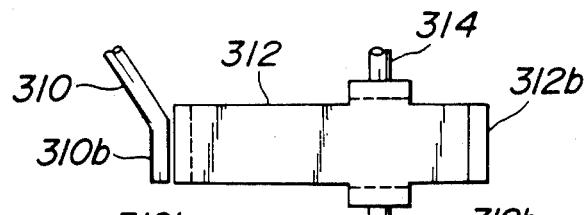
FIGS. 18A and 18B are a plan view and a front view, respectively, showing the lock mechanism shown in FIG. 17.
Figure 18B:
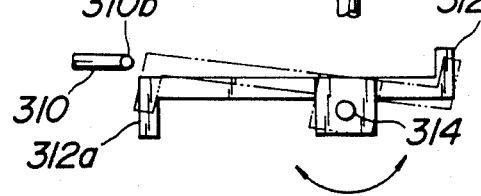

FIGS. 17, 18A and 18B show an embodiment of a latch mechanism in which the medium clamping condition is not released during the head loading.

In this embodiment, there is provided a lock lever 312 the movement of which is interlocked by the movement of the head loading arm 36. A latch 309 is pivoted at the pin 308. A torsion coil spring 310 as the elastic member is wound around the pin 308, and end 310a of which is in contact with an up bend 306b protruded from a button lever 306 on the side of the head loading solenoid 41, and another end 310b of which is engaged with an up bend 309a of the latch 309 on the opposite side of the up bend 306b.

The latch 309 is energized by the torsion coil spring 310 to rotate counter-clockwise in FIG. 17, and is always pressed against the up bend 306b by the torsion coil spring 310.

The lock lever 312 is rotatably supported to the two supporting panels 313 attached to the base 1 by a shaft 314, and is energized by a spring (not illustrated) to rotate clockwise in this figure. The lock lever 312 has a down bend 312a which is formed by bending downward one end of the lock lever 312 and an up bend 312b which is formed by bending upward another end.

The down bend 312a is opposite to the end 310b of the torsion coil spring 310, but is not in contact with the end 310b except during the head loading, as shown by a solid line in FIG. 18B. The up bend 312b is opposite to the underside of a free end 36d of the head loading arm 36.

It is preferable that the shaft 314 is disposed at the position in the vicinity of the up bend 312b rather than the down bend 312a. When the up bend 312b is pressed downward by the arm 36, the down bend 312a is rotated upward or raised according to the ratio of the distance between the shaft 314 and the down bend 312a to the distance between the shaft 314 and the up bend 312b.

The lock mechanism of the embodiment is operated as follows.

When the magnetic disc unit does not operate to load the head, the loading arm 36 is kept at its horizontal position, and the lock lever 312 is energized to rotate counter-clockwise in FIG. 17 by a spring not shown. The down bend 312a is in contact with the base 1. Under this condition the end 310b of the torsion coil spring 310 is not in contact with the down bend 312a.

When the head loading solenoid 41 is excited in this condition, a moving rod 41a of the solenoid 41 is drawn back into the solenoid 41, so that the head loading arm 36 is rotated around the shaft 37 in a manner such that the free end 36d of the arm 36 is brought downward by the force of a torsion coil spring 38.

As a result, the up bend 312b is pressed downward, while the down bend 312a is raised upward to contact or to be made adjacent to the end 310b of the torsion coil spring 310 on the side of the lock lever 312, as shown by a two-dot-and-dashed line in FIG. 18B.

In this condition, even if the control button 4, i.e., the button lever 306 is pushed for releasing the lock condition, the latch 309 is not rotated counter-clockwise in FIG. 17, since the energization of the torsion coil spring 310 is controlled by the movement of the arm 36, i.e., the end 310b of the torsion coil spring 310 is in contact with the lock lever 312.

As a result, when head loading, the clamping condition of the clamping lever 306 and the magnetic disc 5 is not released, and the magnetic disc 5 is protected from being damaged.

Figure 19B:
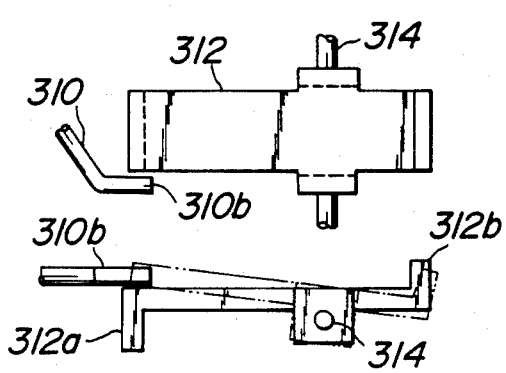

FIGS. 19A and 19B show another embodiment of the lock mechanism. The lock mechanism of FIGS. 19A and 19B is different from the lock mechanism of FIGS. 17, 18A and 18B in that the contact position of the end 310b of the torsion coil spring 310 and the lock lever 312 is changed. In the embodiment, the torsion coil spring 310 is so constructed that the end 310b thereof faces the side of the down bend 312a.

In this embodiment, when the free arm 36d of the head loading arm 36 is brought downward, the latch condition is maintained by the latch lever 312 as well as the embodiment shown in FIGS. 17, 18A and 18B.

Figure 20A:
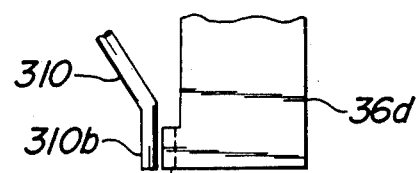
FIGS. 20A and 20B are a plan view and a front view, respectively, showing another embodiment of the lock mechanism.
Figure 20B:
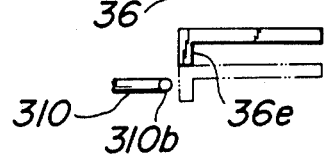

FIGS. 20A and 20B show another embodiment of the latch mechanism. The lock mechanism of FIGS. 20A and 20B is different from the lock mechanism of FIGS. 17, 18A and 18B in that the lock lever 312 is not provided, but the head loading arm 36 is provided to directly keep the lock condition.

In this embodiment, the free end 36d of the head loading arm 36 has a down bend 36e which faces the end 310b of the torsion coil spring 310. When the free end 36d is not brought downward, the down bend 36e is not in contact with the end 310b, as shown by a solid line in FIG. 19B.

Therefore, when loading the head, the free end 36d is brought downward, and the down end 36e is engageable with the end 310b of the torsion coil spring 310, as shown by two-dot-and-dash line in FIG. 20B, so that the latch 309 is inhibited from rotating counter-clockwise in FIG. 17, and the lock condition is maintained.

Referring to FIGS. 21-24, the description of the mechanism for head loading is given.

In the medium clamping condition and the lock condition of the magnetic disc 5 as mentioned above, the head loading arm 36 is in contact with the loading arm 19 and is always forced downward by the spring 38. The head arm 48 carrying the gimbal head 81 is forced downward by the spring 51, so that an arm 48a of the head arm 48 is in contact with the head loading arm 36.

Figure 21:
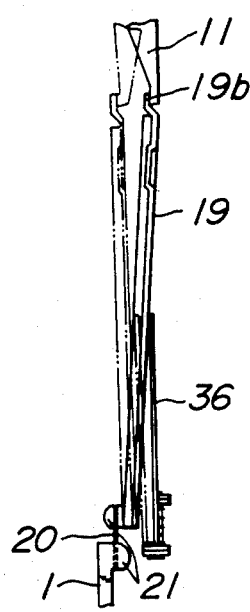
FIGS. 21 and 22 are a side view and a top end view, respectively, showing an embodiment of a head loading mechanism in a magnetic disc unit according to the present invention.
Figure 22:
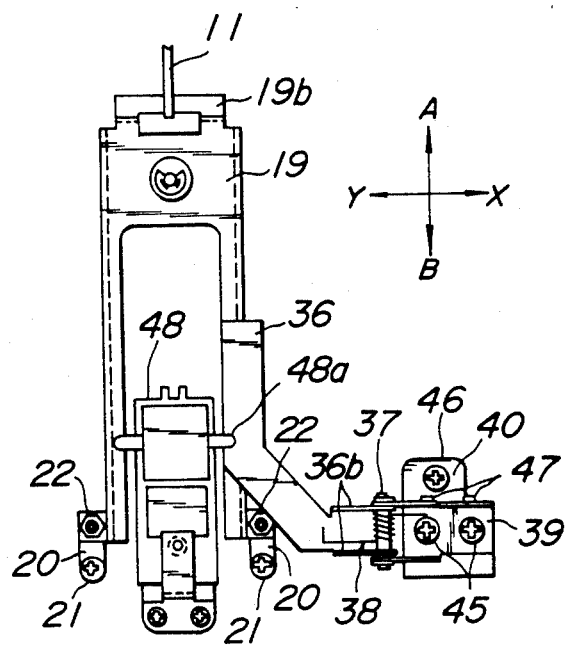
Figure 23:
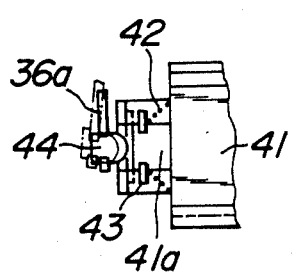
FIG. 23 is an enlarged back view showing partially the head loading mechanism shown in FIGS. 21 and 22.
Figure 24:
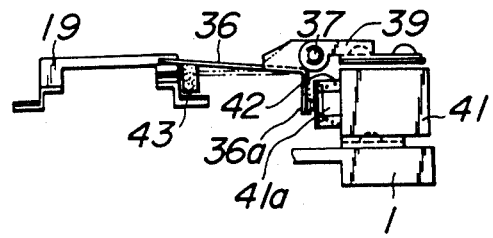
FIG. 24 is a back view showing the head loading mechanism shown in FIGS. 21 and 22.

As shown in FIG. 21, in the medium clamping condition, the loading arm 19 is brought downward, and accordingly the head loading arm 36 and the head arm 48 are brought downward to a given position and then stop there temporarily.

The head loading arm 36 is swingably rotatably supported by the up bends 36b via the shaft 37 on a bracket 39 on a solenoid supporting member 40 mounted on the base 1. An end of a damper 44 is fixed to a down bend 36a of the head loading arm 36, and another end of the damper 44 is opposite to the moving rod 41a of the solenoid 41 at a given position while the head loading arm 36 is brought downward.

The reason why such a given position is provided is that a reduced shock is applied to the gimbal head at the time of head loading by stopping the head on the way to the loading temporarily, instead of loading the head directly to the magnetic disc 5 and by reducing the distance between the head and the magnetic disc 5 and accordingly the distance between the head and the button head positioned on the reverse side of the magnetic disc 5.

When a head loading signal is applied to the solenoid 41, the moving rod 41a is attracted against the spring 42, so that the head loading arm 36 is further brought downward by the spring 38. Then the gimbal head 81 is pressed against the button head 80 via the magnetic disc 5. Then, the preparation of reading or reproducing is completed. When the head loading arm 36 is brought further downward, the pressing pad 43 attached to the head loading arm 36 makes contact with and presses against the magnetic disc 5 to stabilize the magnetic disc 5.

When the application of the head loading signal to the solenoid 41 is terminated, the moving rod 41a is forced to return to its original position from the solenoid 41 by the spring 42, so that the head loading arm 36 is raised by the damper 44.

Then the head arm 48 is raised, so that the gimbal head 81 is returned to the given position mentioned above.

The damper 44 serves to attenuate noise, as mentioned above.

It is preferable that the damper 44 is made from non-magnetic material such as rubber or synthetic resin so as to prevent the head loading arm 36 from being magnetized.

Figure 25:
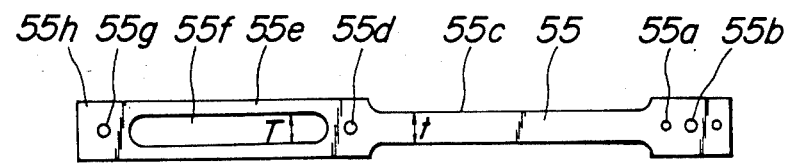
FIG. 25 is a development elevation showing a steel belt of a head seeking mechanism for driving a head carriage in a magnetic disc unit according to the present invention.
Figure 26:
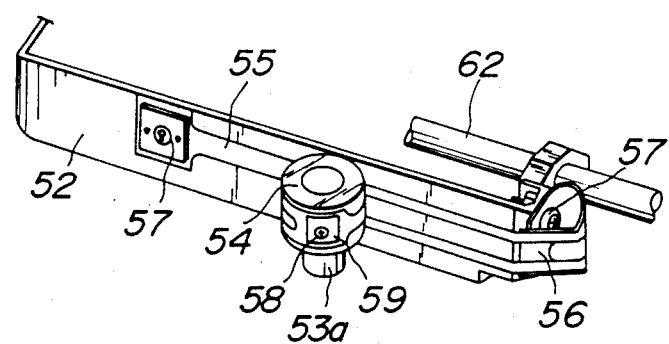
FIG. 26 is a perspective view showing the head seeking mechanism.

Referring to FIGS. 5, 25 and 26, the description of the head seeking mechanism is given.

The stepping motor 53 fixed to the base 1 rotates through a given angle so as to move the head carriage 52 to a given position. With the rotation of the stepping motor 53, a pulley 54 coupled to the stepping motor 53 is rotated to drive the head carriage 52 via a steel belt 55 attached to the head carriage 52. The head carriage 52 is guided at a given position along a guide bar 62 fixed to the base 1 to proceed along a straight line.

FIG. 25 shows an expanded plan view of the steel belt 55. Width T of a slit 55f is relatively larger than width t of a belt portion 55c. An end 55a of the steel belt 55 is passed through the slit 55f so as to form a ring. The pulley 54 to be carried by the ring is fixed to a hole 55d of the steel belt 55 by a screw 58 via a washer 59. The end 55a is fixed to the head carriage 52 by a screw 57.

The steel belt 55 is mounted to the head carriage as shown in FIG. 26. Another end 55h of the steel belt 55 is attached to the head carriage 52 by a screw 57 through a hole 55g. A leaf spring 56 is attached to the inside of the steel belt 55 in the vicinity of the end 55h, so that the steel belt 55 is tensioned without loosening, so that the positioning accuracy of the head carriage 52 is secured.

The latch mechanism is not necessarily limited to such a structure as shown in FIG. 15. For example, a latch mechanism as shown in FIG. 27 may be used.

In FIG. 27, a latch 217 is pivoted at a pin 218 protruded from the base 1 on the opposite side of the control button 4 with respect to a pin 209 when the control button 4 is not pushed. The latch 217 is constantly pushed toward the direction X by a spring 219.

The latch 217 has a notch 217a formed substantially with a "W" shape which has an opening end leftwards substantially in the direction X. The notch 217a has two crooks 217b and 217c forming the "W" shape. A bulge 217d is formed upwards convexly on the under-side of the crook 217c.

The latch mechanism of this embodiment is operated as follows, while co-operating with the pin 209 protruded on the button lever 208.

When the control button 4 is not pushed the button lever 208 is positioned in front of and apart from the latch 217, so that the pin 209 is not in contact with the latch 217. If the control button 4 is pushed, the button lever 208 proceeds forward in the direction X, and the pin 209 is moved along a cam face 217e formed on the side wall on the side of the opening of the notch 217a of the latch 217. In this case, as shown in FIG. 28A, the latch 217 is rotated counter-clockwise around the pin 218.

When the pin 209 reaches the opening end, the pin 209 is engaged into the crook 217b, and the pin 209 sits in the crook 217b.

If the button lever 208 is further pushed by the control button 4, the pin 209 proceeds forwards to enter the crook 217c, while the latch 217 rotates clockwise by the spring 219, as shown by a broken line arrow in FIG. 28B.

The underside of the crook 217c is connected to a concave formed by the bulge 217d which protrudes upwards as shown in FIGS. 29A-29C, so that the pin 209 is led to be engaged with the bulge 217d, as shown in FIG. 29C. The button lever 208 and the pin 209 are energized toward the direction A by the spring to be pulled toward the direction A.

As a result, the pin 209 is moved, while pushing the latch 217 upwards to return to the position shown in FIG. 28A.

FIG. 30 is a perspective view of the magnetic disc unit with the loading arm 19 swung upward relative to the base 1. The cross-hatched area represents an aperture H in the base 1 below which the head carriage 52 moves along guide bars 62. The head 80 and a block 52d, which project from the top surface of the head carriage, extend through the aperture H above the upper side of base 1. The head arm 48 carrying the gimbal head 81 is swingably fixed to the block 52d by screws 49 which are driven into screw holes 49a.

A magnetic disc unit according to the present invention has the following advantages:

(1) Despite the loading arm being so long as to clamp the magnetic disc stably, a magnetic disc unit is made compact, with a reduced height H of the unit by use of a clamping lever co-operating with the loading arm.

(2) A magnetic disc unit has a linkage for transmitting the movement of a clamping lever, so that the force required for the magnetic disc clamping is reduced.

(3) Clamping operations are performed by operating the control button connected to the loading arm extended to the position corresponding to the center cone on the loading arm via the clamping lever instead of extending the loading arm to a front panel, so that the operability of the magnetic disc unit is improved.

(4) A simple arrangement having an ejecting lever and a return spring for returning the ejecting lever easily ensures the ejection of the magnetic disc and the prevention of the clamp of the magnetic disc when the magnetic disc is not completely inserted into the magnetic disc unit, so that the operability and the safety of the magnetic disc unit are improved.

(5) The magnetic disc is more stably loaded by using a compression force exerted by a spring and a sponge pad, instead of a compression force applied by a solenoid and a sponge.

(6) A damper is provided at the contact point between a solenoid and a head loading arm, so that the solenoid noise is reduced and the magnetization of the head loading arm is prevented.

(7) As mentioned above, according to the present invention, a compact magnetic disc unit is obtained with a high operability, a low operating noise, and accurate clamping and ejecting, thereby preventing damage to the magnetic disc.

What is claimed is:

1. A magnetic disc unit for use with a magnetic recording medium comprising:
   a base;
   motor means having a spindle rotatably mounted on said base for rotating said magnetic recording medium;
   a loading arm having a first end and a second end, said second end being swingably attached to said base;
   a center cone rotatably attached to the first end of said loading arm, said magnetic recording medium being interposable between said spindle and said center cone;
   a button lever having a control button projecting from one end thereof, said button lever being attached to said base and translatable with respect thereto;
   a clamping lever rotatably mounted on said base;
   linkage means interlocked to said control button and to said clamping lever, whereby depression of said control button translates said button lever to rotate said loading arm via said linkage means and said clamping lever to a first position wherein said center cone engages said spindle with said magnetic recording medium interposed therebetween, further depression of said control button in the same direction as the previous depression translating said button lever to rotate said loading arm via said linkage means and said clamping lever to a second position wherein said center cone is released from said magnetic recording medium and said clamping lever presses said loading arm in the vicinity of said center cone;
   a head for recording or reproducing information on or from said magnetic recording medium;
   a head loading arm having a first end swingably supported on said base and a second end supported by said loading arm; and
   a head arm supported by said head loading arm and carrying said magnetic head, said head loading arm and said head arm moving, in response to the movement of said loading arm to said first position, to a predetermined position where said magnetic head is in contact with said recording medium and said head loading arm and said head arm withdrawing said magnetic head from said magnetic recording medium in response to the movement of said loading arm to said second position.

2. A magnetic disc unit as claimed in claim 1, wherein the first and second ends of said loading arm are remote from each other and the first end of said loading arm is swingable around the second end thereof as a fulcrum; said head arm has first and second ends remote from each other with said first end being swingable around said second end as a fulcrum, said head arm further having an arm located adjacent the first end of said head arm so that said arm is swingable in response to the movement of said loading arm, said magnetic head being positioned adjacent the first end of said head arm, and said head loading arm being disposed between said loading arm and said arm for transferring the swing of said loading arm to said arm or for swinging only said head arm independently of the swing of said loading arm;

said magnetic disc unit further comprising a head carriage for carrying said magnetic head, said head carriage reciprocally displacing said head arm, said arm thereof and said magnetic head in the direction toward the second end of said loading arm from the vicinity of the first end of said loading arm.

3. A disc unit as claimed in claim 2, wherein said center cone and said spindle are disposed in the vicinity of the first end of said loading arm, said center cone being rotatably pivoted by said loading arm; and said clamping lever is provided with an arm for swinging said loading arm to control clamping of said magnetic recording medium by said center cone and said spindle.

4. A disc unit for use with a recording medium comprising:

a base member;

driving means rotatably mounted on said base member for driving said recording medium;

a first arm member having a first end and a second end, said second end being swingably attached to said base member, said first arm member being movable between a first position and a second position;

a fitting member for rotatably fitting said recording medium to said driving means, said fitting member being attached to the first end of said first arm member;

a lever member rotatably mounted on said base member and for pressing said first arm member in the vicinity of said fitting member;

recording or reproducing means for recording or reproducing information on or from said recording medium;

a seond arm member having a first end swingably supported on said base member and a second end supported by said first arm member, said second arm member being disposed on said first arm member to follow a movement of said first arm member;

carriage means moving along said base member in a longitudinal direction of an arm connecting said first end and said second end of said first arm member; and a third arm member disposed via said second arm member on said first arm member to follow a movement of said first or second arm member, said third arm member being swingably attached to said carraige means, and supported by said second arm member and carrying said recording or reproducing means, said second arm member and said third arm member moving, in response to the movement of said first arm member to said first position, to a predetermined position where said recording or reproducing means is in contact with said recording medium and said second arm member and said third arm member withdrawing said recording or reproducing means from said recording medium in response to the movement of said first arm member to said second position.

5. A disc unit as claimed in claim 4, wherein the first and second ends of said first arm member are remote from each other and the first end of said first arm member is swingable around the second end thereof as a fulcrum;

said third arm member has first and second ends remote from each other with said first end being swingable around said second end as a fulcrum, said third arm member further having an arm located adjacent the first end of said third arm member so that said arm is swingable in response to the movement of said first arm member, said recording or reproducing means being positioned adjacent the first end of said third arm member, and said second arm member being disposed between said first arm member and said third arm member for transferring the swing of said first arm member to said third arm member or for swinging only said third arm member independently of the swing of said first arm member; and said disc unit further comprising a head carriage for carrying said recording or reproducing means, said carriage means reciprocally displacing said third arm member, said arm thereof and said recording or reproducing means in the direction toward the second end of said first arm member from the vicinity of the first end of said first arm member.

6. A disc unit as claimed in claim 5, wherein said fitting member is disposed in the vicinity of the first end of said first arm member, said fitting member being rotatably pivoted by said first arm member; and said lever member is provided with an arm for swinging said first arm member to control clamping of said recording medium by said fitting member.

* * * * *